Nov. 5, 1968  H. E. KROLL  3,408,801
NON-SPILL GRASS CATCHER
Filed Oct. 22, 1965
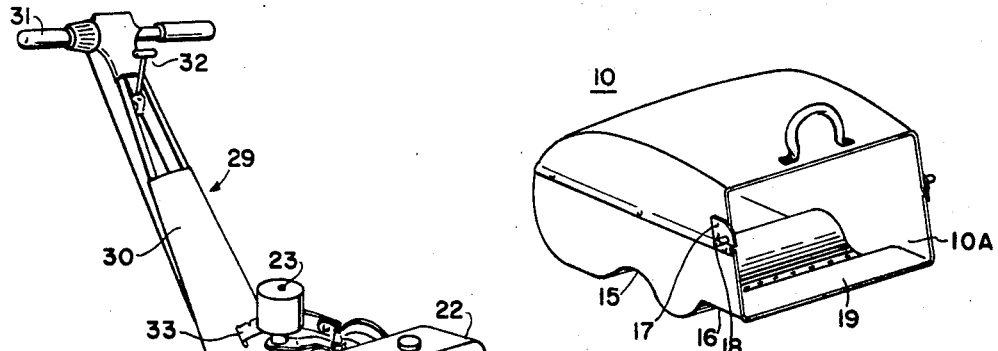
Fig. 1
Fig. 2
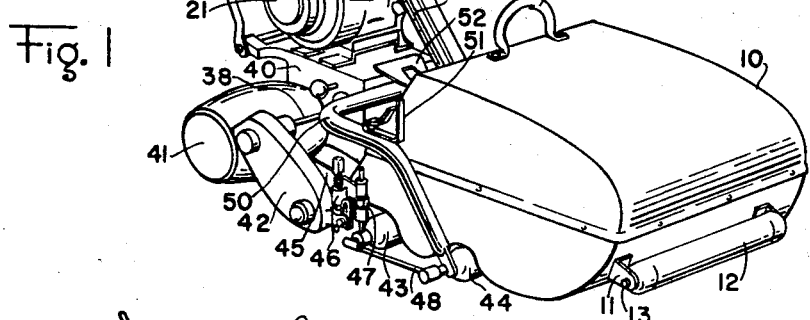
Fig. 5
Fig. 6
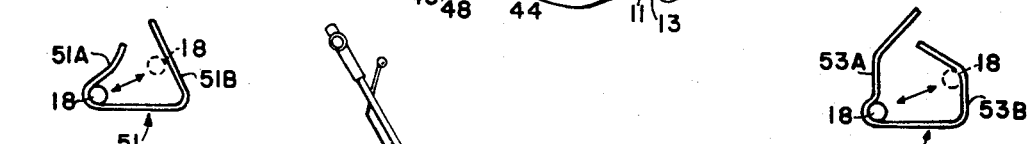
Fig. 3
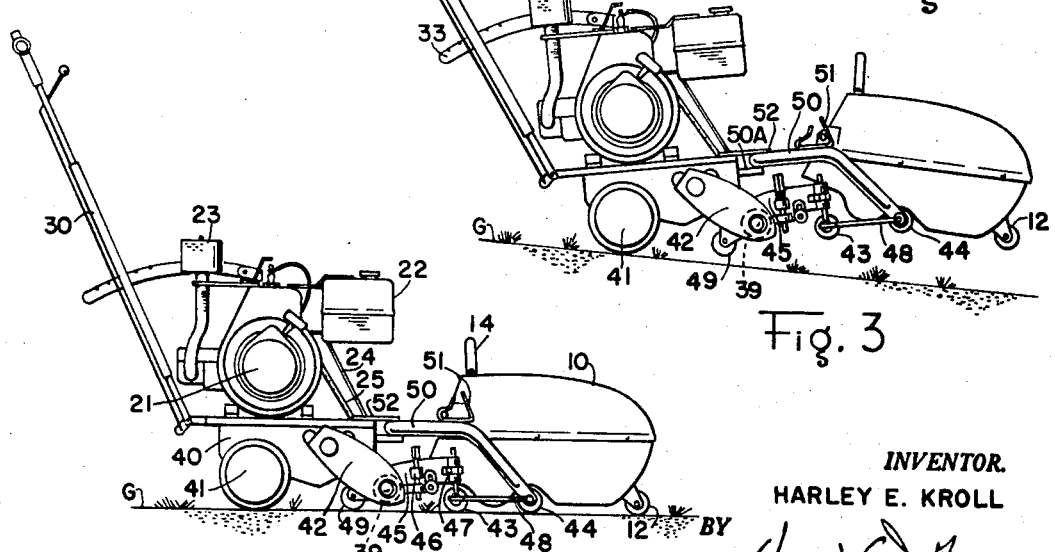
Fig. 4
*INVENTOR.*
HARLEY E. KROLL
BY
ATTORNEY United States Patent Office 3,408,801
Patented Nov. 5, 1968

3,408,801
NON-SPILL GRASS CATCHER
Harley E. Kroll, Chaska, Minn., assignor to Toro Manufacturing Corporation, Minneapolis, Minn., a corporation of Minnesota
Filed Oct. 22, 1965, Ser. No. 500,543
10 Claims. (Cl. 56—199)

ABSTRACT OF THE DISCLOSURE

A front mounted catcher for a lawn mower which tilts downwardly and forwardly relative to the frame when the front end of the mower is raised to prevent spilling of the clippings from the catcher. The catcher is also capable of longitudinal shifting movement relative to the frame when the frame is pulled rearwardly to encourage the clippings to move to the back of the catcher.

---

This invention relates to lawn mower grass catchers, and more particularly to those catchers which are mounted on the front end of the mower and are frequently raised from normal operative position during use by tilting of the mower.

This invention is particularly applicable to mowers of the type commonly known as "greensmowers" for cutting golf course putting greens, although the invention is not necessarily limited to mowers of this type.

In conventional "greensmowers" which employ a grass catcher mounted on the front end of the mower, the grass catcher is mounted on the mower in such fashion that its position is fixed relative to the mower frame at all times. The catcher is mounted forwardly of the cutter and usually has a rearwardly directed mouth or opening facing the cutter for receiving the clippings therefrom. During use, when the operator completes a pass across the green and reaches the edge thereof, he must tilt the front end of the mower upwardly to raise the cutter to an inoperative position to avoid cutting the taller grass surrounding the putting green while he is making his turn so as to begin another pass across the green. The conventional grass catcher, due to its fixed relationship to the mover frame, is inclined downwardly and rearwardly by this tilting of the mower, which causes clippings or cuttings already in the catcher to be spilled rearwardly therefrom. The same problem occurs when the mower is tilted for transportation purposes. Also, in mowers of this type, the clippings tend to collect and build up predominantly in the area closest to the mouth of the catcher which is further encouraged by the downward-rearward tilting of the catcher when the front end of the mower is elevated. Therefore, the full capacity of the catcher will not be realized, and the catcher must be emptied more often than is desirable or should be necessary, unless the operator interrupts the cutting periodically and takes the trouble to manually move the clippings to the rear of the catcher.

Therefore, an important object of this invention is to provide a grass catcher for mowers of this type which will not be tilted downwardly and rearwardly when the forward end of the mower is raised and will not spill the contents therefrom when so raised.

Still another object is to provide a grass catcher for mowers of the type described which will minimize or prevent excessive build up of clippings adjacent the mouth of the catcher and which will enable more clippings to be put into the catcher before it must be emptied or attended to.

More specifically, it is an object of this invention to provide a catcher for mowers of the type described which is capable of freely shifting its position relative to the mower when the front end is raised so that the catcher will not be tilted downwardly and rearwardly from its normal operative position.

A further object is to provide a catcher which will not only not be tilted downwardly and rearwardly by the raising thereof, but which will in fact be tilted forwardly and downwardly when raised so that the contents thereof will tend to gravitate to the back of the catcher.

Still another object is to provide a grass catcher which, as it is being raised, will shift its position longitudinally of the mower and will be jarred sufficiently by this longitudinal shifting action to encourage the clippings to move to the rear of the catcher.

These and other objects will be more fully understood from the following description and accompanying drawings in which:

FIGURE 1 is a perspective view of a "greensmower" embodying a grass catcher constituting one preferred form of this invention, FIGURE 2 is a perspective view of the grass catcher mounted on the mower of FIGURE 1, FIGURE 3 is a side elevational view of the mower of FIGURE 1 with the front end thereof in raised elevated inoperative position, FIGURE 4 is a side elevational view of the mower of FIGURE 1 in lowered normal operative position, FIGURE 5 is an enlarged view of the catcher mounting bracket of FIGURES 1, 3 and 4, and FIGURE 6 is an enlarged view of an alternate form of catcher mounting bracket.

Referring to the drawings, the illustrated mower includes a grass catcher or basket 10 detachably and shiftably mounted on the front end of the mower in a manner hereinafter described. This grass catcher 10 is completely enclosed except for a rearwardly facing mouth or opening 10A provided therein for receiving the clippings from the cutter. The back or leading end of the catcher is provided with a ground engaging roller 12 for supporting the catcher during cutting, said roller being mounted on the basket by means of mounting brackets 11 which support pivot pins 13 carried by the roller 12. The catcher is also provided with a handle 14 for carrying same about and for facilitating the mounting and dismounting thereof on the mower. The bottom of the catcher is provided with a pair of transversely disposed grooves or channels 15 and 16 for receiving a pair of mower supporting rollers in a manner hereinafter described. Each side wall of the catcher is provided with a mounting bracket 17 adjacent the mouth 10A of the catcher, said brackets 17 carrying laterally extending pins 18 for attaching the catcher to the mower in a manner hereinafter described. The lower edge of the catcher mouth is defined by a ledge 19 constituting a part of the catcher bottom, which ledge is positioned closely adjacent the cutter to prevent clippings from falling to the ground and assuring their entry into the catcher.

The mower on which catcher 10 is mounted includes an engine 20 mounted on a transmission case or housing 40, said engine being furnished with a recoil starter 21, a fuel tank 22, and an air cleaner 23. A belt guard 24 overlies a drive belt 25 from the engine to the transmission. A steering handle asembly 29 is pivotally and adjustably mounted on the rear of the transmission case, said handle assembly including a front panel having a vertical latch receiving slot formed therein, handle grips 31, and a clutch control lever 32. An elongate, curved, spring tensioned handle latch 33 extends rearwardly from the engine housing through the slot in panel 30, the upper edge of said latch being provided with a series of handle engaging notches.

The top of the slot of panel 30 seats in any of the notches of the latch 33, to hold the handle at the desired angle. A pair of driven barrel shaped traction rollers 41 extend laterally from opposite sides of the transmission case 40 for propelling the mower. A cutter drive shaft 38 also extends laterally from the transmission case 40 for driving a reel type cutter 39, shown in dotted outline in FIGURES 3 and 4, said drive shaft and cutter being drivingly interconnected by suitable chain drive mechanism (not shown) which is enclosed in the reel drive cover 42.

To support the forward end of the mower, a pair of rollers 43 and 44 are provided, said rollers being respectively accommodated in the recesses 16 and 15 in the bottom of the catcher and spaced slightly from said bottom so as not to engage same during cutting. Mounting plates 45 extend forwardly from opposite ends of the cutter assembly, on which plates are mounted a bedknife adjustment assembly 46 to adjust the reel assembly to the bed-knife, and a height of cut adjustment assembly 47 to selectively adjust the height of cut. A pull arm assembly 48 extends between and interconnects the rollers 43 and 44. Another roller 49 is attached to and mounted rearwardly of the cutter assembly for maintaining same above the ground.

A grass catcher supporting fork or yoke 50 is provided on the front end of the mower, said fork having a pair of forwardly and downwardly extending legs between which the catcher is located, said fork being connected to the transmission case 40 by means of a yoke pivot unit 50A which enables the entire fork to pivot about a horizontal longitudinal axis to enable the mower to follow the ground contours without digging or gouging thereof. The roller 44 is attached to the lower front end of said fork. A stabilizer spring plate 52 is attached to the transmission case and extends forwardly therefrom in overlying engagement with the fork 50 to stabilize the movements thereof.

To mount the catcher 10 on the mower, upstanding generally U-shaped mounting brackets 51 having upstanding rear arms 51A and front arms 51B are provided on opposite sides of the fork 50 on each of the legs thereof. These brackets receive the pins 18 of the catcher, in the manner illustrated, so that the catcher, when in the lowered normal operative position of FIGURE 4 is free to pivot about a horizontal axis defined by said pins transverse to the direction of travel relative to the yoke 50 and the remainder of the mower structure.

When the catcher is mounted on the mower in the lowered operative position of FIGURE 4, it is supported entirely by the pins 18 and the roller 12. The rollers 43 and 44 of the mower frame are accommodated in the recesses 16 and 15 respectively of the bottom of the catcher, but said rollers are not in engagement with any portion of the catcher so that there will be no frictional engagement therebetween during use. In the operative position of FIGURE 4, the lower edge 19 of the catcher is closely adjacent the reel 39 and the mouth 10A of the catcher is so positioned as to receive the clippings from the cutter.

When the catcher is in lowered operative position, with the catcher roller 12 engaged with the ground, the catcher is pushed rearwardly so that the pins 18 thereof are pressed against and held by the rear arms 51A of the bracket 51. The arms of the brackets 51 are spaced apart a sufficient distance so that the pins 18 of the catcher are free to shift longitudinally of the mower and are free to swing forwardly and upwardly from their lowered operative position against the rear arms 51A to a raised inoperative position in which they rest against and are held by the front arms 51B and hold the catcher in the desired non-spilling raised position. FIGURE 5 illustrates this movement of the pins 18 from the solid line operative position against arm 51A to the broken line inoperative position against arm 51B. Thus, in the raised inoperative position, the catcher is tilted forwardly and downwardly with respect to the remainder of the mower and in the course of the transition from moving from lowered operative position to raised inoperative position, the catcher is never tilted rearwardly and downwardly and therefore the contents are not spilled therefrom when the catcher is raised. The tilting of the mower is usually accomplished with such rapidity that the longitudinal shifting movement of the catcher and the impact thereon caused by the change in position jars the catcher and the contents thereof sufficiently to cause the clippings to move from the front to the back end of the catcher and thereby clear the area adjacent the mouth of the catcher to receive additional clippings and thereby enable more clippings to be put into the catcher before it needs emptying or attention by the operator.

In the illustrated form of the invention, the catcher in the raised position assumes the same position relative to the ground that it had when in the lowered operative position of FIGURE 4. However, in another preferred form of the invention, the cooperating parts of the mower frame and catcher which control the position of the catcher when raised are so adjusted that the back or leading end of the catcher drops a further distance than is illustrated in FIGURE 3 so that the catcher when raised assumes a downwardly and forwardly inclined position from its normal operative horizontal position so as to further facilitate and encourage the movement of the clippings from the front to the back of the catcher.

Thus, the pivotal attachment of the catcher to the mower frame, combined with the independent support of the catcher on the ground provided by its roller 12 enables the catcher to tilt relative to the frame when raised so as to either retain its normal horizontal operative position relative to the ground or to tilt downwardly and forwardly from the normal position to facilitate movement of the clippings to the rear of the catcher. The ability of the catcher to shift longitudinally of the frame when raised permits the catcher to be jarred sufficiently to aid moving the clippings from the front to the rear of the catcher.

In mowers of this type, it is desirable to have the bottom of the catcher as close to the ground as possible without actually engaging same to provide a catcher having as large a capacity as possible. In the illustrated embodiment, with the roller 44 underlying the central portion of the catcher, the portion of the catcher bottom defining the groove 15 is designed to fit as closely to the roller 44 as possible without actually engaging same to increase catcher capacity and also to present an internal barrier or baffle being formed which would unduly interfere with the movement of the clippings to the rear of the catcher. In such a situation, the roller 44 engages the bottom of the basket almost immediately after the upward tilting of the mower frame begins. In such a situation, sufficient tilting of the catcher relative to the frame does not occur if the pins 18 retain their normal operative position against the back arm of the bracket 51 as illustrated in FIG. 4. Therefore, once the roller 44 is engaged with the bottom of the catcher, the catcher must be free to pivot about the roller without tilting rearwardly so as to be able to at least retain its normal operative position relative to the ground. To accomplish this, the pins 18 must be free to swing upwardly and forwardly once the catcher is supported by the roller 44. The brackets 51 are so designed so as to permit this free upward and forward swinging movement of the pin to enable the catcher to tilt about the roller 44. The brackets 51 are so designed as to enable the pin to swing freely forwardly and upwardly with the front arm of the brackets serving to act as a stop member to limit the upward-forward swinging movement of the pin and hold the catcher in a desired inoperative raised position.

FIGURE 6 illustrates another catcher mounting bracket 53 which can be substituted for the aforedescribed bracket 51. This bracket has a rear arm 53A which holds pin 18 in cutting position and a front arm 53B which holds the pin and catcher in raised position, this bracket also permitting longitudinal shifting and upward-forward swinging of the pins, and is particularly effective in preventing accidental disengagement of the pins from the brackets. The pins 18 are the only direct connection between the catcher and the mower frame and serve as the means for transmitting directional propulsive force from the mower frame to the catcher for pushing and propelling said catcher. The pins 18 also function as stop, motion restricting, and positioning elements for the catcher, since their engagement with the various portions of the brackets 51 or 53 limits the movement of the catcher in any particular direction and determines the position of the catcher in any given situation. The pins can also pass freely between the arms of brackets 51 and 53 to facilitate intentional removal and replacement of the catcher on the frame. However, the brackets are so designed as to inhibit and minimize accidental disengagement of the pins and bracket during use.

The independent support of the catcher on the ground provided by roller 12 relieves the mower frame of a substantial portion of the weight of the clippings and thereby provides a better and more uniform cutting action. The catcher, by means of its direct engagement with the ground through roller 12, and its pivotal mounting on the frame through pins 18, is free to follow the ground contours and oscillate up and down independently of the frame during mowing.

Thus, this invention embodies a catcher mounted on the frame in such fashion that it is free to tilt relative to the frame when the frame is tilted upwardly so as to continuously be in a non-spilling position within the normal range of tilting movement of the frame. The movement of the catcher relative to the frame may be a simple swinging action, or it may be a swinging action combined with longitudinal shifting to provide additional impetus to move the clippings away from the mouth and towards the rear of the catcher. In the illustrated embodiment, there is a slight initial tilting about the pins 18, followed by tilting about the roller 44, about which the major portion of the tilting action takes place, the pins stopping the tilting movement of the catcher upon their engagement with the forward bracket arms 51B or 53B. There is also some sliding of the catcher on the roller, which provides the longitudinal shifting. It will be understood that means other than those illustrated can be used to accomplish the non-spill tilting of the catcher within the scope of this invention. For example, it is contemplated that in one form of the invention, the pins 18 could function as the sole or primary pivot axis for the catcher during its tilting movement relative to the frame to maintain or assume a non-spilling position relative thereto.

It will, of course, be understood that various changes may be made in the form, details, arrangement and proportions of the various parts without departing from the scope of my invention.

What I claim is:
1. A mower comprising:
a mobile frame having mounted thereon a cutter,
a catcher located forwardly of said cutter,
said catcher being ground supported when in cutting position and having a rearwardly facing mouth for receiving clippings from said cutter,
means located rearwardly of said cutter and about which said frame is tiltable for raising said cutter and catcher from lowered cutting position to a raised inoperative position in which said cutter is no longer ground supported,
and means connecting said catcher and frame which enables said catcher to swing relative to said frame when raised by the tilting thereof to assume a downwardly and forwardly inclined position relative to the tilted frame.

2. The mower of claim 1 wherein said connecting means includes:
pin means carried by said catcher, and
upstanding generally U-shaped bracket means carried by said frame and supporting said pin means,
said pin means being shiftable longitudinally of said frame between the arms of said bracket means.

3. The mower of claim 1, wherein said connecting means includes:
pin means extending laterally from said catcher, and
upstanding generally U-shaped bracket means carried by said frame and oriented longitudinally thereof and supporting said pin means,
said pin means being held by the rearward arm of said bracket means when the catcher is in lowered cutting position,
said pin means being adapted to swing upwardly and forwardly from engagement with the rearward arm of said bracket means to engagement with the forward arm of said bracket means when said catcher swings relative to said frame to thereby hold said catcher in said downwardly and forwardly inclined position relative to said frame and allowing free passage of pins between arms for removal and replacement of basket.

4. The mower of claim 3, including roller means carried by said frame and transversely underlying said catcher,
said catcher being adapted to tilt about said roller means after being raised from ground support by the tilting of said frame to assume the aforementioned downwardly and forwardly inclined position relative to said frame.

5. A mower comprising:
a mobile frame having a forked leading end portion,
ground engaging first roller means carried by said forked portion,
a catcher having a generally rearwardly facing clipping receiving opening positioned between the arms of said forked portion and overlying said first roller means,
ground engaging second roller means carried by said catcher and supporting the leading end portion thereof,
pin means carried by said catcher and extending from opposite sides thereof,
upstanding generally U-shaped bracket means mounted on the arms of said forked portion,
said bracket means loosely receiving said pin means and supporting the trailing end portion of said catcher,
said pin means being shiftable longitudinally of said frame between the arms of said bracket means,
ground engaging means located rearwardly of said catcher about which said frame is tiltable for raising said forked portion and lifting said second roller means from ground engagement,
said catcher, when no longer ground supported, tilting about said first roller means whereby the trailing end portion of said catcher swings upwardly and forwardly relative to said forked portion.

6. A mower comprising:
a mobile frame having mounted thereon a cutter,
a catcher located forwardly of said cutter,
said catcher having a rearwardly facing mouth for receiving clippings from said cutter,
means located rearwardly of said cutter and about which said frame is tiltable for raising said cutter and catcher from lowered cutting position to a raised inoperative position in which said cutter is no longer ground supported,
and means connecting said catcher and frame which enables said catcher to swing relative to said frame when raised by the tilting thereof to assume a downwardly and forwardly inclined position relative to the tilted frame.

7. The mower of claim 6, wherein said means connecting said catcher and frame enables said catcher to shift longitudinally forwardly relative to said frame when raised from cutting position by tilting of said frame.

8. The mower of claim 7, wherein said catcher is ground supported when in cutting position.

9. A mower comprising:
a mobile frame having mounted thereon a cutter,
a catcher located forwardly of said cutter,
said catcher having a rearwardly facing mouth for receiving clippings from said cutter,
and means connecting said catcher and frame which enables said catcher to freely shift longitudinally forwardly relative to said frame from a rearward position to a forward position in response to rearward shifting movement of said frame.

10. The mower of claim 9, wherein said catcher is ground supported in cutting position, and when ground supported biased towards said rearward position when said frame is moving forward.

References Cited

UNITED STATES PATENTS

| | | | |
|---|---|---|---|
| 426,984 | 4/1890 | Coldwell | 56—199 |
| 601,008 | 3/1898 | Trisler | 56—199 |
| 1,798,021 | 3/1931 | Jerram | 56—200 |
| 1,881,618 | 10/1932 | Jacobsen | 56—200 |
| 3,099,122 | 7/1963 | Sakatani | 56—199 |

FOREIGN PATENTS 617,679    2/1949    Great Britain.

ROBERT E. BAGWILL, *Primary Examiner.*